United States Patent Office 3,637,544
Patented Jan. 25, 1972

3,637,544
VULCANIZED ELASTOMERIC BLENDS CONTAINING A CYCLIC ESTER POLYMER
Robert Dean Lundberg, Somerville, N.J., and Joseph Victor Koleske and Earl Richard Walter, Charleston, W. Va., assignors to Union Carbide Corporation, New York, N.Y.
No Drawing. Filed Apr. 1, 1969, Ser. No. 812,335
Int. Cl. C08c 9/16; C08d 9/08
U.S. Cl. 260—3                                10 Claims

ABSTRACT OF THE DISCLOSURE

Vulcanizable elastomeric blends having improved processability, additive acceptance, improved strengths in the vulcanized form, improved creep resistance in the unvulcanized form, improved handling and forming characteristics in the unvulcanized form and/or improved stiffness, or in some cases improved flexibility, in the uncured and cured forms, containing a vulcanizable rubber gumstock having substantial, residual, ethylenic unsaturation and a cyclic ester polymer containing recurring units of the formula:

(I) 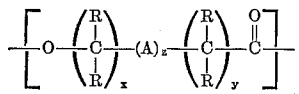

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3, and up to a minor molar amount of recurring units of the formula:

(II) 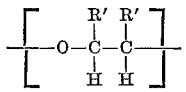

wherein each R' is selected from the class consisting of, individually, hydrogen, alkyl, cycloalkyl, aryl, and chloroalkyl, and, together with the ethylene moiety of the oxyethylene chain of Unit II, a saturated cycloaliphatic hydrocarbon ring having 4 to 8 carbon atoms, and vulcanizables thereof.

These novel vulcanizable elastomeric compositions are useful in the production of molded articles of a variety of shapes and forms as, for example, films, wire and cable coatings, articles of manufacture, and the like, and can be vulcanized or thermoset in such shapes and forms.

BACKGROUND OF THE INVENTION

(a) Field of the invention

The present invention relates to novel vulcanizable elastomeric compositions or blends containing a rubber gumstock, or vulcanizable elastomer, having substantial, residual, ethylenic unsaturation such as, natural rubber gumstocks and synthetic rubber gumstocks and cyclic ester polymers, such as polymers of epsilon-caprolactone, and having a wide range of application in the production of thermoset shaped articles such as films, fibers, automotive tires, and other shaped articles.

(b) Description of the prior art

Vulcanizable elastomers in the nature of natural rubber and synthetic rubbers including nitrile rubbers, butyl rubbers, butadiene rubbers and the like have been long known and extensively used in the manufacture of automotive tires, household articles, aircraft tires, hoses, wearing apparel, protective coatings, wire and cable coatings, sealing materials, diaphragm materials and a wide variety of articles. While such heretofore known elastomers possessed important and unique properties which enhanced their widespread use for a great many applications, there has been a need to modify or correct certain undesirable properties in order to widen the field of use of such materials.

For example, most vulcanizable elastomers of this type are subject to creep or very sluggish flow upon standing for extended periods of time, for example, in bale form in warehouses. This tendency to creep has required extensive precautions to properly confine the unvulcanized materials while in storage.

In addition, the elastic or sticky nature of the unvulcanized gumstock material renders it difficult to handle and shape into desired forms. Moreover, the vulcanizable gumstock is relatively low in strength properties such as tensile strength and/or rupture strength. Certain vulcanizable gumstocks such as ethylene-propylene terpolymer rubber gumstocks are rather stiff and somewhat difficult to shape and form in the absence of softeners. Another area of potential improvements by adding modifiers is in the processability of the vulcanizable gumstock during which fillers, accelerators, antioxidants, lubricants, curing agents and other chemical additives are blended into the gumstock. Due to the highly viscous nature of the gumstock during processing, it is sometimes extremely difficult to disperse the additives uniformly throughout the gumstock.

It has been difficult heretofore to modify the vulcanizable or thermoset elastomeric materials with substantial amounts of other polymeric materials. Previous attempts to modify vulcanizable elastomers have in most cases resulted in rejection of the added polymeric material by the gumstock producing a non-uniform product or resulted in an unacceptable deterioration of the physical properties of the gumstock or rendered the gumstock either not at all vulcanizable or vulcanizable only to a very small degree. Moreover, in those instances where even limited success was attained, they were limited only to specific elastomeric systems or materials and were not applicable to even closely related systems or materials.

SUMMARY OF THE INVENTION

The present invention provides vulcanizable elastomeric compositions or blends which encompass a broad and diverse range of vulcanizable rubber gumstocks or elastomers having substantial, residual, ethylenic unsaturation and provides a means for readily altering the properties of such important vulcanizable rubber gumstocks as the gumstocks of natural rubber and synthetic rubbers including butadiene rubber gumstocks, nitrile rubber gumstocks, butyl rubber gumstocks, ethylene-propylene terpolymer rubber gumstocks, isobutylene rubber gumstocks, silicone rubber gumstocks, and the like. Heretofore, it was the case that, in many instances, when a polymeric modifier was attempted to be added to a rubber gumstock, the gumstock would not readily accept the polymeric material and there resulted non-uniform masses and non-uniform deteriorated properties.

This is not the case with the novel vulcanizable elastomeric compositions of this invention which contain cyclic ester polymers uniformly blended throughout with a vulcanizable elastomeric material or rubber gumstock. Unlike the previous attempts to form uniform blends of vulcanizable gumstocks with substantial amounts of polymeric modifiers, the vulcanizable gumstock readily accept the acyclic ester polymer blended therein through the present invention. This ease of acceptance of cyclic ester polymers applies throughout a diverse range of gumstocks to provide diverse improvements in the properties of the gumstock. Despite the presence of cyclic ester polymer uniformly blended in the gumstocks its ability to be cured or vulcanized is not significantly affected.

When the cyclic ester polymer is added and blended with the vulcanizable gumstock, the processability of the gumstock is considerably improved. Not only are the milling characteristics of the gumstock enhanced, but also additives such as fillers, accelerators, curing agents, e.g., sulfur, peroxides and the like and other common rubber additives are more readily dispersed throughout the mass of the gumstock.

Moreover, the resulting vulcanizable elastomeric composition on which this invention is based possesses a considerably improved creep resistance as compared to the gumstock without the cyclic ester polymer modifier, thus greatly facilitating the handling, packaging, shipping and storage of the gumstock.

The handling and shaping of the novel vulcanizable elastomeric compositions to fabricate shaped articles is also facilitated. The strength properties such as tensile strength and rupture strength of the unvulcanized vulcanizable elastomeric compositions of this invention are considerably improved, as compared to the unvulcanized, vulcanizable gumstock component alone. For example, the excessive stringiness of the gumstock component alone is considerably reduced by the addition and blending in of the cyclic ester polymer which imparts considerably more body to the gumstock. The novel compositions are more readily spread to conform to the configuration of molds and can be formed into sheets or other shapes which are easier to handle and fabricate in the desired manner in the uncured or unvulcanized state. The novel compositions are less stringy and can be more easily spread and shaped into the desired configuration.

The vulcanizable gumstock component of the novel compositions have a glass transition temperature or melting point below room temperature and have substantial, residual, ethylenic unsaturation which can be cured or vulcanized to form crosslinks by the addition of sulfur, a peroxide or other curing or vulcanizing agents or by means of radiation or any other suitable means. When mixed with a curing agent or vulcanizing agent such as sulfur or a peroxide, the rubber gumstock can be aptly called a thermosetting composition.

The vulcanizable rubber gumstock component of the compositions of this invention are to be distinguished from thermoplastic rubbery materials which have a glass transition temperature or melting point above room temperature and which do not have substantial, residual, ethylenic unsaturation. Thermoplastic materials of this type are not vulcanizable or curable to form crosslinks by means of sulfur, peroxide or other agents or by radiation. Thermoplastic materials of this type usually derive their rubbery nature by means of added plasticizers and are not usually thermosetting when contacted with curing or vulcanizing agents such as sulfur, peroxides or radiation.

The term "substantial, residual, ethylenic unsaturation" as used herein is intended to designate the presence of sufficient ethylenic unsaturation in the gumstock to permit adequate crosslinking without elimination of the rubbery quality of the final product. The precise numerical amounts of such unsaturation is not critical nor are they a criterion of the present invention. These amounts are well established or determinable by those skilled in the art of rubber gumstock compounding in accordance with the properties desired for the vulcanized, thermoset rubber. The degree of unsaturation can be conveniently expressed as the weight percent of ethylenic groups, $>C=C<$, combined in the gumstock based on the weight of the gumstock per se. Illustratively, the degree of unsaturation extends from about 0.2 to about 60 percent, preferably about 0.5 to about 50 percent.

Many specific types of vulcanizable rubber gumstocks can be used. There can be mentioned, of course, natural rubber gumstock; polymerized diolefins such as diolefin homopolymers, e.g., polybutadiene, diolefin copolymers, e.g., styrene-butadiene copolymers (GRS), acrylonitrile-butadiene copolymers (nitrile rubber), isobutylene-butadiene copolymers (butyl rubber) and the like and terpolymers of diolefins such as acrylonitrile-styrene-butadiene terpolymers, ethylene-propylene-1,6-hexadiene terpolymers and the like, chloroprene rubber, neoprene rubber, silicone rubbers such as high molecular weight, poly(dimethylsiloxanes) having a small percentage of vinyl groups bonded to silicon, and in general any vulcanizable gumstock material having sufficient ethylenic unsaturation to permit crosslinking into a thermoset rubber can be employed.

The polymers of cyclic esters which are contemplated in the practice of the invention are those which possess a reduced viscosity value of at least about 0.1 to about 15, and desirably from about 0.4 to about 10, and higher. The preferred polymers of cyclic esters have a reduced viscosity value of from about 0.6 to about 7. These polymers are further characterized by the following recurring structural linear Unit I:

(I) 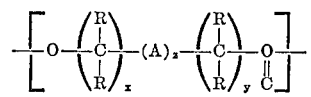

wherein each R, individually, is hydrogen, alkyl, halo, or alkoxy; wherein A is the oxy group, wherein $x$ is an integer from 1 to 4; wherein $y$ is an integer from 1 to 4; wherein $z$ is an integer of zero or one; with the provisos that (a) the sum of $x+y+z$ is at least 4 and not greater than 7, and (b) the total number of R variables which are substituents other than hydrogen does not exceed 3, preferably does not exceed 2, per unit. Illustrative R variables include methyl, ethyl, isopropyl, n-butyl, sec-butyl, t-butyl, hexyl, chloro, bromo, iodo, methoxy, ethoxy, n-hexoxy, 2-ethylhexoxy, dodecoxy, and the like. It is preferred that each R, individually, be hydrogen, lower alkyl, e.g., methyl, ethyl, n-propyl, isobutyl, and/or lower alkoxy, e.g., methoxy, ethoxy, proproxy, n-butoxy, and the like. It is further preferred that the total number of carbon atoms in the R substituents does not exceed twenty.

In one embodiment, highly desirable polymers of cyclic esters which are contemplated are characterized by both recurring structural Unit I supra and recurring structural Unit II:

(II) 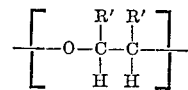

wherein each R', individually, is hydrogen, alkyl, cycloalkyl, aryl, or chloroalkyl, or in which the two R' variables together with the ethylene moiety of the oxyethylene chain of Unit II form a saturated cycloaliphatic hydrocarbon ring having from 4 to 8 carbon atoms, desirably from 5 to 6 carbon atoms. It is preferred that recurring Unit II contains from 2 to 12 carbon atoms. Illustrative R' variables include methyl, ethyl, n-propyl, isoproyl, t-butyl, the hexyls, the dodecyls, 2- chloroethylphenyl, phenethyl, ethylphenyl, cyclopentyl, cyclohexyl, cycloheptyl, and the like. It is preferred that R' be hydrogen; lower alkyl, e.g., methyl, ethyl, n-propyl, isopropyl; chloroalkyl, e.g., 2-chloroethyl; and the like.

The aforedescribed recurring linear Unit (I) is interconnected through the oxy group (—O—) of one unit with the carbonyl group

of a second unit. In different language, the interconnection of these units does not involve the direct bonding of two carbonyl groups, i.e.,

The terminal moieties of the cyclic ester polymers are not determinable by infra-red analysis which factor is readily understandable since macromolecules are involved.

When the cyclic ester polymers are prepared from a mixture containing the cyclic ester monomer and minor amounts of a cyclic comonomer which is copolymerizable therewith, e.g., alkylene oxide, oxetane, tetrahydrofuran, etc., the polymeric chain of the resulting copolymeric product will be characterized by both recurring linear Unit I supra as well as the recurring linear Unit II which would represent the alkylene oxide comonomer polymerized therein. When the comonomer is an alkylene oxide, then the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) of recurring linear Unit II is interconnected with the carbonyl group (III)

of recurring linear Unit I supra or with the alkylene moiety of a second oxyalkylene Unit (II).

Particularly preferred polymers of cyclic ester are those which are characterized by the oxypentamethylene-carbonyl chain as seen in recurring structural Unit III:

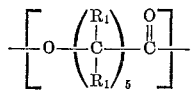

wherein each $R_1$ is hydrogen or lower alkyl, preferably hydrogen or methyl, with the proviso that no more than three $R_1$ variables are substituents other than hydrogen.

The preparation of the cyclic ester polymers is well documented in the patent literature as exemplified by U.S. Pats. Nos. 3,021,309 through 3,021,317. Briefly, the process involves the polymerization of an admixture containing at least one cyclic ester monomer and a suitable catalyst.

Suitable monomeric cyclic esters which can be employed in the manufacture of the cyclic ester polymers are best illustrated by the following formula:

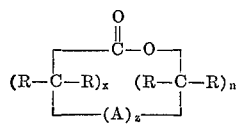

wherein the R, A, x, y, and z variables have the significance noted in Unit I supra.

Representative monomeic cyclic esters which are contemplated include, for example, delta-valerolactone; epsilon-caprolactone; zeta-enantholactone; the monoalkyl-delta-valerolactones, e.g., the monomethyl-, monoethyl-, monohexyl-, delta-valerolactones, and the like; the dialkyl-delta-valerolactones, e.g., the dimethyl-, diethyl-, and di-n-octyl-delta-valerolactones, and the like; the monoalkyl-, dialkyl-, and tri-alkyl-epsilon-caprolactones; e.g., the monomethyl-, monoethyl-, monohexyl-, dimethyl-, diethyl-, di-n-propyl-, di-n-hexyl-, trimethyl-, triethyl-, and tri-n-propyl-epsilon-caprolactones, and the like; the monoalkoxy- and dialkoxy-delta-valerolactones and epsilon-caprolactones, e.g., the monomethoxy-, monoisopropoxy-, dimethoxy-, and diethoxy-delta-valerolactones and epsilon-caprolactones, and the like; 1,4-dioxane-2-one; dimethyl-1,4-dioxane-2-one; and the like. A single cyclic ester monomer or mixture of such monomers may be employed.

The polymerization process is desirably effected under the operative conditions and in the presence of anionic catalysts as noted in U.S. Pats. Nos. 3,021,309 to 3,021,317, such as, dialkylzinc, dialkylmagnesium, dialkylcadmium, trialkylaluminum, dialkylaluminum alkoxide, alkylaluminum dialkoxide, dialkylaluminum, halide, aluminum trialkoxide, alkyllithium, and aryllithium. Specific anionic catalysts would include di-n-butylzinc, diethylmangesium, di-n-butylmagnesium, dimethylcadmium, diethylcadmium, di-t-butylcadmium, triethylaluminum, triisobutylaluminum, tri-2-ethylhexylaluminum, aluminum triisopropoxide, aluminum triethoxide, ethyllithium, n-butyllithium, phenyllithium, and the like.

Cyclic ester/alkylene oxide copolymers can be prepared by reacting an admixture comprising cyclic ester and alkylene oxide monomers, an interfacial agent such as a solid, relatively high molecular weight poly(vinyl stearate) or lauryl methacrylate/vinyl chloride copolymer (reduced viscosity in cyclohexanone at 30° C. of from about 0.3 to about 1.0), in the presence of an inert normally-liquid saturated aliphatic hydrocarbon vehicle, such as, heptane, phosphorus pentafluoride as the catalyst therefor, at an elevated temperature, e.g., about 80° C., and for a period of time sufficient to produce such cyclic ester/alkylene oxide copolymers.

Typical alkylene oxides which can be employed to manufacture cyclic ester/alkylene oxide copolymers are shown by the formula:

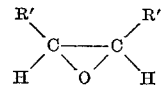

wherein each R', individually, has the meanings noted in Unit II supra. Illustrative alkylene oxides would include ethylene oxide, propylene oxide, the butylene oxides, styrene oxide, epichlorohydrin, cyclohexene oxide, and the like.

The cyclic ester polymers employed herein contain in the polymeric chain, a major molar amount, i.e., greater than 50, preferably greater than about 80 to about 100 mol percent, of Units I and a minor molar amount, i.e., about 0 percent to less than about 50, preferably less than about 20, mol percent, of other units such as alkylene oxide Units II, catalyst residues, etc. The cyclic ester polymers containing about 100 mol percent of Unit I are preferred and those in which Unit I represents the oxypentamethylene carbonyl moiety are most preferred.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 gram of polymer in 100 milliliters of benzene (e.g., benzene is preferred although cyclohexanone, benzene, chloroform, toluene, or other organic solvent for the polymer may be used) at 30° C.

The cyclic ester polymer can be fluxed on a mill and sheeted off to form sheets or films. It can be extruded as a tape, rope, or any other shape or can be extruded and pelletized. When formed by the dispersion polymerization technique, the cyclic ester polymer is obtained in powder or granular form. It can also be dissolved in a suitable solvent, such as, benzene, toluene, 2-nitropropane, methylene chloride and other solvents. Methylene chloride and other fast drying solvents are preferred when the cyclic ester is applied to the rubber gum stock as a solution. The cyclic ester polymer can be employed in this invention in any of the above forms, although it is usually preferred to employ it in the form of powders, granules or pellets.

The relative proportions of cyclic ester polymer and vulcanizable rubber gumstock to be employed in the novel compositions of this invention can be varied over very wide percentage ranges depending upon the particular characteristics desired in the particular composition being prepared and its intended use. For example, the cyclic ester polymer can be present in amounts ranging from about 1 to about 90% and the vulcanizable rubber gumstock can be present in amounts ranging from about 10 to about 99%, based on the total weight of rubber gumstock and cyclic ester polymer. It is preferred in most cases to utilize a major amount of the rubber gumstock and a minor amount of the cyclic ester polymer.

A surprising aspect of the present invention is the discovery that improved properties are obtained when even very small amounts of the cyclic ester polymer are used. It is equally, if not more surprising to have found that even major amounts of cyclic ester polymer, i.e., up to about 90 weight percent, does not render the rubber gumstock unvulcanizable. It is an extremely important discovery of this invention that, when up to 50% on a weight basis of cyclic ester polymer is used in the novel compositions, there results a non-tacky vulcanizable elastomeric composition which can be molded at elevated temperatures and under pressures, if desired, to form rubber-like articles. The unvulcanized but vulcanizable blends containing minor amounts of cyclic ester polymer can be molded without curing to form sheets, plaques or other articles which are non-blocking and can be stacked one upon the other without sticking together. Subsequently, they can be shaped by molding at elevated temperatures and pressures or by other means and cured into a thermoset article. Even relatively minor amounts such as 10% or less increase the stiffness of most unvulcanized gumstocks and render them non-tacky and creep resistant.

The vulcanizable rubber gumstock and cyclic ester polymer can be mixed or blended by any desired technique. For example, they can be blended on a two-roll mill or other equipment at low to moderate temperatures, for example, in the range of 60° C. or higher, for example, up to as high as 180 to 250° C. However, lower temperatures are usually suitable and are economically preferred.

Suitable equipment for fluxing the gumstock and cyclic ester polymer together include Banbury mixers, screw extruders, two-roll mills, or any other mixing devices adapted to mix highly viscous or gummy materials at low to moderate temperatures. The time of blending or fluxing is no narrowly critical and a sufficient blending time to obtain a substantially uniform blend is usually satisfactory. Mixing of the cyclic ester polymer and the vulcanizable rubber gumstock in the heated or molten state is believed to be facilitated by the partial hydrocarbon nature of the cyclic ester polymer. There is no apparent phase separation and there is no significant loss of physical properties in blending the two different polymeric materials together in accordance with this invention.

Illustrative times of blending are in the range of 1 and 2 minutes to 30 minutes or an hour. In the usual case about 5 to 15 minutes is adequate. After adequate blending, the vulcanizable elastomeric composition is cooled to ambient temperature and can be shaped and/or formed in any desired manner. If desired, other materials can be added during blending, for example, the usual ingredients used in the compounding of rubber gumstocks can be employed. Such added materials can include fillers, antioxidants, light stabilizers, heat stabilizers, plasticizers, etc.

The vulcanizable elastomeric compositions of this invention have improved physical properties which are at least similar to the physical properties of the major component of the composition. A most striking aspect of the invention is that additions of cyclic ester polymers in amounts over a wide range are readily accepted by a wide range of diverse vulcanizable rubber gumstocks and at the same time retain the characteristic of being vulcanizable or curable through the media of sulfur, peroxides, or radiation, and temperature and/or pressure. The resulting vulcanizates also retain the rubbery characteristics which would be obtained by vulcanizing the corresponding vulcanizable rubber gumstock component alone.

Another striking characteristic of the novel compositions is that even when the cyclic ester polymer is present in amounts up to 50% by weight based on the two components, the resulting compositions are non-tacky and non-blocking, unlike the unvulcanized, vulcanizable rubber gumstock component alone. This enables the facile handling, shaping and otherwise using of the unvulcanized compositions with ease and without significant reduction in their ability to be vulcanized. Moreover, even low amounts, e.g., about 10% or less of cyclic ester polymer greatly reduce the creep of the vulcanizable rubber gumstock component alone.

Another important discovery in this invention is the discovery that films made from the novel compositions and cured can be oriented by stretching at moderately elevated temperatures, for example, near the melting point of the contained cyclic ester polymer, e.g., more than about 60° C. or higher, and then cooled to ambient temperature while maintained in the stretched condition. This results in a very large permanent type set that remains in the film even after the stretching tension has been removed. Then when the temperature of the film is raised under no tension it returns to its original length, i.e., its length before stretching. Various other shapes and forms of objects can be made from the novel compositions and their configuration and/or dimensions can be changed by tension and heat. The imparted configuration and/or dimensions can be frozen in by cooling while maintaining the tension and the object will then be in a condition where it will return to its original configuration and/or dimensions upon warming. This unusual property of the novel compositions after curing can be used in the formation of seals, repair tapes and films, and/or connectors between materials.

Certain high modulus vulcanizable rubber gumstocks have extremely useful properties but have limited application because they are somewhat too stiff either in the gumstock form or in the vulcanized or vulcanizate condition. Rubber gumstocks of this type are the ethylene-propylene-diolefin terpolymer rubber gumstocks. These types of gumstocks are significantly improved by the presence of cyclic ester polymers, in accordance with this invention. It has been found that stiffness is drastically reduced when the cyclic ester polymer is blended into this type of gumstock, even in such low amounts as 10 percent based on the weight of gumstock and cyclic ester polymer. The resulting blend is easily handled, shaped and formed in the desired manner and cured or vulcanized by the conventional techniques for such gumstocks. Moreover, the modulus or stiffness of vulcanizates of this type of gumstocks can be readily adjusted to the desired value by means of the amount of cyclic ester polymer present in the blend.

DESCRIPTION OF SPECIFIC EMBODIMENTS

The following examples are presented. Unless otherwise specified, all percentages and parts are by weight, all temperatures are on the centigrade scale, and all reduced viscosities are measured at a concentration of 0.2 gram of polymer in 100 milliliters of benzene at about 30° C. The melt index values for polyethylene were obtained at 44 p.s.i. and 190° C. Figures given for physical properties in the tables below are averages of test results on two or more samples of each material and, in some instances, such averages have been rounded off.

The testing for physical properties was done on an Instron tensile tester using specimens about ¼ inch wide, 0.020 to 0.30 inch thick and about one inch in gauge length. Gauge length is the length of the specimen between the jaws of the testing apparatus. The secant modulus or stiffness was determined at a strain rate of 10% in inches per inch per minutes and the other tensile property at a strain rate of 100% in inches per inch per minute.

Secant modulus or stiffness

This value was determined by subjecting the specimen to tensile stress and elongating it 1%. The modulus is then calculated as the ratio of the tensile stress (T) needed to elongate the sample 1% of its original length to the elongation (or strain) of the specimen.

1% secant modulus for a 1 in. specimen $= T/0.01 = 100T$

Yield stress

This value was determined as the stress at the first major break in the stress-strain curve and usually corresponds to the necking-in point.

Tensile strength or ultimate strength

This value was determined as the tensile stress at rupture of the specimen. It was calculated from the load on the specimen at rupture, divided by the original cross-sectional area.

Elongation

This value was determined as the extension of the specimen at the point of break or rupture.

$$\text{Percent elongation} = \frac{L - L_0}{L_0} \times 100\%$$

L = length at rupture
$L_0$ = initial length of specimen.

Rupture energy

This value was determined as the area under the entire stress-strain curve when the sample is subjected to tensile stress up to the rupture point.

Strain rate

This value is the rate at which the sample is being elongated relative to its original dimension. Thus, if a one inch gauge length sample is used and the cross head of the testing apparatus is driven at a speed of one inch per minute, the strain rate is the ratio of gauge length to this speed or one inch divided by one inch per minute which is a rate of one inch per inch per minute. This value is reported hereinbelow as a percent, in which case the ratio is multiplied by 100%.

EXAMPLE 1

A series of 36 blends were made by first fluxing each rubber gumstock identified in Tables I through VI below on a warm two-roll mill (40° to 80° C.).

Then as indicated in the tables below a cyclic ester polymer of epsilon-caprolactone was added to the fluxing gumstock. The cyclic ester polymer used in each case was prepared by a dispersion polymerization in heptane of epsilon-caprolactone in the presence of 3% vinyl chloride-lauryl methacrylate as interfacial agent and 0.15% of triisobutylaluminum as catalyst (percentages based on weight of caprolactone) and had a reduced visoosity of 1.88. This polymer is called PCL in this example. After addition of the cyclic ester polymer the band on the mill was cut and overlapped about 6 inches 6 to 8 times to provide more uniform blending.

A similar quantity of each of the gumstocks (Nos. 1, 8, 15, 22, 29 and 36 in the tables) was fluxed in the same manner but no PCL was added.

Thereafter, carbon black in the amount shown in each of Tables I through VI was added to each band on the mill and the band in each case was then end-cut and overlapped about 6 inches 6 to 8 times to provide more uniform blending. It is to be noted that no carbon black was added to blends 2, 5, 9, 12, 16, 19, 23, 26, 30, 33, 37 and 40.

Thereafter, the remaining compounding ingredients were added in all cases (Nos. 1-42) as listed in each recipe at the bottom of the tables in the order of zinc oxide, then stearic acid, then sulfur, then oil and softener if required, then antioxidant, if required, and finally accelerator. After addition of all ingredients, the band in each case was end-cut and overlapped about 6 inches 6 to 8 times to provide more thorough blending. Finally, the band was cut and end-passed through the mill bite 10 times and then it was sheeted off the mill for molding or curing.

The milling characteristics of all blends containing PCL were as good and in most cases better than the milling characteristics of the rubber gumstocks not containing PCL.

As shown in Tables I through VI, blends 4, 7, 11, 14, 18, 21, 25, 28, 32, 35, 39 and 42 and the gumstocks containing no PCL (1, 8, 15, 22, 29 and 36) were compression molded and cured under the time and temperature conditions respectively shown in the tables. The remaining blends were compression molded at about 1000 p.s.i. under the time and temperature conditions respectively shown in the tables but were not substantially cured.

The molded, and the molded and cured, blends and gumstocks containing no PCL were tested on an Instron tensile tester and the measurements are correspondingly shown in the tables.

It was noted that in all blends containing PCL, the carbon black was much more easily dispersed throughout the gumstock as compared to those materials containing no PCL, namely, Nos. 1, 8, 15, 22, 29, and 36. It was also noted as shown in the tables that each of the cured blends responded readily to sulfur curing and that the added PCL showed no signs at all of interfering with the curing. It was also noted as shown by the increase in secant modulus in the tables that the addition of PCL, especially at the 50% PCL level, increased the stiffness of the cured blends with the exception of the ethylene/propylene terpolymer rubber gumstock as shown in Table V. As regards the terpolymer rubber gumstock (Table V), the addition of PCL imparted flexibility (secant modulus was decreased), thereby eliminating one main disadvantage in this type of terpolymer rubber gumstock.

In many cases significant improvements in gloss were observed for the blends containing PCL over gumstocks not containing PCL. The data given in the tables also shows that the addition of PCL improved the creep resistance of the gumstocks. Overall processability was considerably improved in the blends that contained PCL over those gumstocks that contained no PCL.

In certain cases the tensile strength, rupture strength and stiffness of the cured blends containing PCL were considerably higher than those gumstocks containing no PCL (blends 4 and 7 compared to gumstock 1 and blends 11 and 14 compared to gumstock 8), with little difference in elongation.

In all cases, the tensile strength of the uncured gumstock increased five- to fifteen-fold or more with increasing PCL content. In all cases, the rupture strength of the unfilled, uncured gumstocks increased at least four- to five-fold.

This example demonstrates the utility of PCL as a modifier for elastomers to improve processability, to strengthen uncured gumstocks during handling and fabrication prior to curing, to stiffen and improve creep resistance of elastomers such as natural rubber, polybutadiene rubber, styrene-butadiene copolymer rubber, nitrile rubber and butyl rubber, and to flexibilize ethylene-propylene terpolymer rubber, without significant interference with the curing characteristics.

TABLE I
Physical properties of blends of natural rubber, smoked sheet [1] and PCL blends, filled and crosslinked

| Blend No. | 1 | 2 | 3 | 4 | 5 | 6 | 7 |
|---|---|---|---|---|---|---|---|
| PCL, wt. percent | 0 | 10 | 10 | 10 | 50 | 50 | 50 |
| Rubber, wt. percent | 100 | 90 | 90 | 90 | 50 | 50 | 50 |
| Carbon black, p.p.hr | 45 | 0 | 45 | 45 | 0 | 45 | 45 |
| Sulfur crosslinked | Yes | No | No | Yes | No | No | Yes |
| Cured (molded), min./° C | 30/140 | (1/80) | (1/80) | 30/140 | (1/80) | (1/80) | 30/140 |
| 1% secant modulus, p.s.i.[2] | 611 | 1–10 | 269 | 1,770 | 737 | 7,245 | 6,331 |
| Tensile strength, p.s.i. | 1,848 | <1 | 32 | 2,507 | 346 | 530 | 2,575 |
| Elongation, percent | 682 | 460 | 286 | 580 | 230 | 98 | 618 |
| Rupture energy, in.-lbs./in.[3] | 5,467 | 18 | 92 | 7,175 | 698 | 414 | 9,505 |
| Strain rate, in./in./min | 100 | 100 | 100 | 100 | 100 | 100 | 100 |

[1] The natural rubber gumstock had a reduced viscosity of about 2.84 dl./gm. when measured in benzene at 30° C. and a concentration of 0.2 gm./100 ml. Specific gravity is about 0.92.
[2] Secant modulus obtained at 10% strain rate, in./in./min.

Compounding recipe: | Parts
---|---
Resin (rubber+PCL) | 100.0
Carbon black O | 45.0
Sulfur | 2.5
Zinc oxide | 3.0
Stearic acid | 2.0
Circisol 42–XH (softener) | 5.0
Sanocure (antioxidant) | 0.4

Compounding recipe: | Parts
---|---
Resin (rubber+PCL) | 100.0
Philblack O | 50.0
Zinc oxide | 5.0
Stearic acid | 1.0
Sulfur | 1.5
Aminox (antioxidant) | 1.5
Altax (accelerator) | 1.5

TABLE IV
Physical properties of nitrile gumstock [1] (butadiene, about 65%/acrylonitrile, about 35%) and PCL blends, filled and crosslinked

| Blend No. | 22 | 23 | 24 | 25 | 26 | 27 | 28 |
|---|---|---|---|---|---|---|---|
| PCL, wt. percent | 0 | 10 | 10 | 10 | 50 | 50 | 50 |
| Hycar 1052, wt. percent | 100 | 90 | 90 | 90 | 50 | 50 | 50 |
| Carbon black, p.p.hr | 50 | 0 | 50 | 50 | 0 | 50 | 50 |
| Sulfur crosslinked | Yes | No | Yes | No | No | No | Yes |
| Cured (molded), min./° C | 60/140 | (1/120) | (1/120) | 60/140 | (1/120) | (1/120) | 60/140 |
| 1% secant modulus, p.s.i.[2] | 1,247 | 80 | 1,333 | 2,495 | 9,855 | 9,667 | 18,057 |
| Tensile strength, p.s.i. | 4,018 | 60 | 125 | 3,789 | 617 | 729 | 2,684 |
| Elongation, percent | 980 | 93 | 221 | 869 | 322 | 58 | 244 |
| Rupture energy, in.-lbs./in.[3] | 16,573 | 61 | 336 | 15,090 | 1,924 | 338 | 4,316 |
| Strain rate, in./in./min | 100 | 100 | 100 | 100 | 100 | 100 | 100 |

[1] The reduced viscosity of the butadiene/acrylonitrile copolymer was about 0.90 dl./gm. when measured in benzene at 30° C. and at a concentration of 0.2 gm./100 ml.
[2] Secant modulus obtained at 10% strain rate, in./in./min.

TABLE II
Physical properties of cis-polybutadiene rubber gumstock [1] and PCL blends, filled and crosslinked

| Blend No. | 8 | 9 | 10 | 11 | 12 | 13 | 14 |
|---|---|---|---|---|---|---|---|
| PCL, wt. percent | 0 | 10 | 10 | 10 | 50 | 50 | 50 |
| Cis-4, wt. percent | 100 | 90 | 90 | 90 | 50 | 50 | 50 |
| Carbon black, p.p.hr | 50 | 0 | 50 | 50 | 0 | 50 | 50 |
| Sulfur crosslinked | Yes | No | No | Yes | No | No | Yes |
| Cured (molded), min./° C | 30/150 | (1/100) | (1/100) | 30/150 | (1/100) | (1/100) | 30/150 |
| 1% secant modulus, p.s.i.[2] | 394 | 6 | 545 | 1,353 | 6,564 | 10,902 | 9,781 |
| Tensile strength, p.s.i. | 818 | 1–2 | 46 | 984 | 821 | 711 | 1,992 |
| Elongation, percent | 828 | 368 | 134 | 608 | 669 | 88 | 500 |
| Rupture energy, in.-lbs./in.[3] | 3,089 | 13 | 65 | 3,213 | 4,750 | 521 | 6,571 |
| Strain rate, in./in./min | 100 | 100 | 100 | 100 | 100 | 100 | 100 |

[1] The polybutadiene was about 95% cis-configuration, and it had a reduced viscosity of about 3.16 dl./gm. when measured in benzene at 30° C. and at a concentration of 0.2 gm./100 ml.
[2] Secant modulus obtained at 10% strain rate, in./in./min.

Compounding recipe: | Parts
---|---
Resin (rubber+PCL) | 100.0
Philblack O | 50.0
Zinc oxide | 3.0
Stearic acid | 2.0
Agerite stalite (antioxidant) | 1.0
Philrich 5 (softener) | 5.0
Sulfur | 1.75
NOBS Special (accelerator) | 0.9

Compounding recipe: | Parts
---|---
Resin (rubber+PCL) | 100.0
Philblack O | 50.0
Zinc oxide | 5.0
Stearic acid | 1.5
Sulfur | 1.5
Aminox (antioxidant) | 1.5
Altax (accelerator) | 1.5

TABLE III
Physical properties of styrene (about 25%)/butadiene (about 75%) rubber gumstock [1] and PCL blends, filled and crosslinked

| Blend No. | 15 | 16 | 17 | 18 | 19 | 20 | 21 |
|---|---|---|---|---|---|---|---|
| PCL, wt. percent | 0 | 10 | 10 | 10 | 50 | 50 | 50 |
| SBR-1500, wt. percent | 100 | 90 | 90 | 90 | 50 | 50 | 50 |
| Carbon black, p.p.hr | 50 | 0 | 50 | 50 | 0 | 50 | 50 |
| Sulfur crosslinked | Yes | No | No | Yes | No | No | Yes |
| Cured (molded), min./° C | 60/140 | (1/120) | (1/120) | 60/140 | (1/120) | (1/120) | 60/140 |
| 1% secant modulus, p.s.i.[2] | 3,670 | 402 | 911 | 1,777 | 7,658 | 7,571 | 13,685 |
| Tensile strength, p.s.i. | 3,261 | 54 | 104 | 1,317 | 473 | 580 | 1,071 |
| Elongation, percent | 1,268 | 65 | 213 | 550 | 193 | 44 | 28 |
| Rupture energy, in.-lbs./in.[3] | 18,689 | 37 | 238 | 3,293 | 884 | 201 | 221 |
| Strain rate, in./in./min | 100 | 100 | 100 | 100 | 100 | 100 | 100 |

[1] The reduced vicosity of the styrene/butadiene copolymer was about 2.4 dl./gm. when measured in benzene at 30° C. and at a concentration of 0.2 gm./100 ml.
[2] Secant modulus obtained at 10% strain rate in./in./min.

TABLE V

Physical properties of ethylene/propylene terpolymer rubber gumstock (Nordel 1040)[1] and PCL blends, filled and crosslinked

| Blend No. | 29 | 30 | 31 | 32 | 33 | 34 | 35 |
|---|---|---|---|---|---|---|---|
| PCL, wt. percent | 0 | 10 | 10 | 10 | 50 | 50 | 50 |
| Nordel 1040, wt. percent | 100 | 90 | 90 | 90 | 50 | 50 | 50 |
| Carbon black, p.p.hr. | 50 | 0 | 50 | 50 | 0 | 50 | 50 |
| Sulfur crosslinked | Yes | No | No | Yes | No | No | Yes |
| Cured (molded), min./° C | 60/140 | (1/110) | (1/110) | 60/140 | (1/110) | (1/110) | 60/140 |
| 1% secant modulus, p.s.i.[2] | 19,797 | 262 | 1,198 | 3,554 | 5,911 | 8,355 | 14,018 |
| Tensile strength, p.s.i. | 2,690 | 85 | 99 | 2,243 | 314 | 541 | 1,458 |
| Elongation, percent | 787 | 58 | 305 | 686 | 19 | 46 | 431 |
| Rupture energy, in.-lbs./in.[3] | 9,427 | 24 | 331 | 7,036 | 115 | 253 | 4,772 |
| Strain rate, in./in./min. | 100 | 100 | 100 | 100 | 100 | 100 | 100 |

[1] Made by E. I. du Pont de Nemours & Co., Inc. and believed to be a polymer of about 46 mole percent propylene, about 49 mole percent ethylene and about 5% of a diene such as 1,4-hexadiene. The terpolymer had a reduced viscosity of about 1.8 dl./gm. when measured in heptane at 25° C. and at a concentration of 0.1 gm./100 ml.
[2] Secant modulus obtained at 10% strain rate, in./in./min.

Compounding recipe:

| | Parts |
|---|---|
| Resin (rubber+PCL) | 100.0 |
| Philblack O | 50.0 |
| Zinc oxide | 5.0 |
| Stearic acid | 1.0 |
| Sulfur | 1.5 |
| Captax (accelerator) | 0.5 |
| Monex (accelerator) | 1.5 |

TABLE VI

Physical properties of butyl rubber gumstock (Enjay 365)[1] medium unsaturation, and PCL blends, filled and crosslinked

| Blend No. | 36 | 37 | 38 | 39 | 40 | 41 | 42 |
|---|---|---|---|---|---|---|---|
| PCL, wt. percent | 0 | 10 | 10 | 10 | 50 | 50 | 50 |
| Enjay 365, wt. percent | 100 | 90 | 90 | 90 | 50 | 50 | 50 |
| Carbon black, p.p.hr. | 50 | 0 | 50 | 50 | 0 | 50 | 50 |
| Sulfur crosslinked | Yes | No | No | Yes | No | No | Yes |
| Cured (molded), min./° C | 20/160 | (1/120) | (1/120) | 20/160 | (1/120) | (1/120) | 20/160 |
| 1% secant modulus, p.s.i.[2] | 2,300 | 238 | 1,895 | 2,220 | 4,352 | 12,829 | 23,786 |
| Tensile strength, p.s.i. | 1,827 | 46 | 90 | 1,446 | 353 | 526 | 691 |
| Elongation, percent | 889 | 110 | 195 | 875 | 68 | 95 | 24 |
| Rupture energy, in.-lbs./in.[3] | 7,253 | 45 | 196 | 5,917 | 207 | 510 | 132 |
| Strain rate, in./in./min. | 100 | 100 | 100 | 100 | 100 | 100 | 100 |

[1] Made by Enjay Company believed to be a polymer of about 98% isobutene and about 2% of a diene such as isoprene or butadiene. It had a specific gravity of about 0.91 and a reduced viscosity of about 0.64 dl./gm. when measured in benzene at 30° C. and a concentration of 0.2 gm./100 ml.
[2] Secant modulus obtained at 10% strain rate, in./in./min.

Compounding recipe:

| | Parts |
|---|---|
| Resin (rubber+PCL) | 100.0 |
| Philblack O | 50.0 |
| Zinc oxide | 5.0 |
| Stearic acid | 2.0 |
| Sulfur | 1.25 |
| Methyl tuads (accelerator) | 1.5 |
| Captax (accelerator) | 1.0 |

EXAMPLE 2

Sheets of cured blends Nos. 7, 14 and 28 as prepared in Example 1 were stretched at 70° C. in an Instron tester to double the original length of each sheet. This resulted in substantially about 100% orientation. The elongated sheets were allowed to cool to room temperature while maintained in the elongated condition. When removed from the Instron tester, each sheet retained substantially all of its elongated length. This indicates a high permanent set in each sheet. When the sheets were warmed again to about 70° C., each sheet returned or shrank back substantially to its initial dimensions. Thus, sheets of these blends as well as other blends containing PCL listed in Tables I through VI find utility as heat shrinkable rubbers for such applications as wrappings and coverings for pipes, packaging, electrical tape and so forth.

EXAMPLE 3

A blend of a silicone rubber gumstock poly(dimethyl siloxane) gumstock (containing 0.4 weight percent vinyl groups bonded to silicone) and a cyclic ester polymer is prepared as follows. The cyclic ester polymer, designated in this example as PCL, is prepared by dispersion polymerization of epsilon-caprolactone in heptane using 3.5% vinyl chloride-lauryl methacrylate copolymer as interfacial agent and 0.5% triisobutylaluminum (percentages based on weight of caprolactone) and has a reduced viscosity of 0.93.

The blend is prepared by milling 100 parts of the silicone rubber gumstock on a two-roll mill and blending in 10 parts of PCL. The mixture is mixed at a temperature of about 140° F. for a sufficient period of time to obtain a uniform blend. Thereafter, 30 parts of finely divided silica is added and blended in for about 5 minutes at 140° F. Then 0.5 part of di-t-butylperoxide is added and blended in at 140° F.

A similar formation is prepared except that no PCL is blended into the gumstock and the milling temperature is 90° F. rather than 140° F.

In each instance, the blend and formulation were sheeted off of the mill and cooled. It is observed that processability of the gumstock containing PCL is superior to that of the gumstock containing no PCL and that the silica is accepted very readily in the blend containing PCL as compared to the formulation containing no PCL. In addition, it is noted that the blend containing PCL had considerably improved antistatic properties as compared to the formulation containing no PCL while the tensile properties of the PCL-containing formulation were not markedly different from those of the formulation containing no PCL.

EXAMPLE 4

Two portions of nitrile rubber gumstock and two portions of styrene/butadiene rubber gumstock (described in Example 1) each respectively containing 0, 10, 0 and 10% PCL (described in Example 1) were blended with 50 phr. carbon black and various additives and cured to form crosslinked rubbers. The various additives added to each blend were

|  | Phr. |
|---|---|
| Zinc oxide | 5.0 |
| Stearic acid | 1.0 |
| Sulfur | 1.5 |
| Aminox (antioxidant) | 1.5 |
| Altax (accelerator) | 1.5 | and were added in the order presented. The materials were milled on a two-roll mill at 40° to 50° C. and were cured by molding at 140° C. and 1000 p.s.i. for 1 hour. The rubbers prepared had the following properties.

TABLE VII

|  | Nitrile | | Styrene-butadiene | |
|---|---|---|---|---|
|  | 43 0% PCL | 44 10% PCL | 45 0% PCL | 46 10% PCL |
| 1% secant modulus, p.s.i.* | 1,200 | 2,200 | 890 | 1,100 |
| Tensile strength, p.s.i. | 4,060 | 3,300 | 2,730 | 3,000 |
| Elongation, percent | 870 | 760 | 1,000 | 810 |
| Strain rate, in./in./min | 100 | 100 | 100 | 100 |

*See Tables I–VI.

EXAMPLE 5

A series of three blends (Nos. 48, 49 and 50) were made by fluxing mixtures of different amounts as shown in Table VIII below of cis-polybutadiene gumstock (described in Example 1) and a cyclic ester polymer (PCL) on a two-roll mill for 5 minutes at 100° C. The cyclic ester polymer employed in each case was prepared by a dispersion polymerization in heptane of epsilon-caprolactone in the presence of 3% vinyl chloride-lauryl methacrylate copolymer as interfacial agent and 0.15% of tri-isobutylaluminum as catalyst (percentages based on weight of caprolactone) and had a reduced viscosity of 1.88. This polymer is called PCL in this example.

The milling characteristics of all these blends containing PCL were good and the hot strength of the blends during milling was adequate.

Samples of cis-polybutadiene gumstock containing no PCL (No. 47) and samples of each blend 48 through 50 were molded into plaques, are tested on the Instron tester and the results are given in Table VIII. Quite surprisingly, the physical properties listed in the table illustrate that the blends were uniform and that cis-polybutadiene gumstock readily accepted the cyclic ester polymer. The blends containing 50% or more PCL were especially easy to handle and work with and in particular the 50% blends (No. 49) could be easily drawn into a fiber. The data in Table VIII also illustrate the improvement in creep resistance during the addition of PCL.

TABLE VIII

Physical properties of cis-polybutadiene rubber gumstock and PCL blends

| Blend No | 47 | 48 | 49 | 50 |
|---|---|---|---|---|
| Wt. percent PCL | 0 | 10 | 50 | 90 |
| 1% secant modulus, p.s.i.* | 34 | 32 | 4,900 | 12,800 |
| Yield stress, p.s.i. | | | | 1,540 |
| Tensile strength, p.s.i. | 30 | 1 | 820 | 5,700 |
| Elongation, percent | 19 | 490 | 800 | 1,800 |
| Rupture energy, in.-lbs./in.³ | 8 | 16 | 4,600 | 50,000 |
| Strain rate, percent, in./in./min | 100 | 100 | 100 | 100 |

*1% secant modulus values obtained at a 10% strain rate, in./in./min.

EXAMPLE 6

A series of three blends (52, 53 and 54) were made by fluxing mixtures of different amounts as shown in Table IX below of natural rubber, smoked sheet, gumstock (described in Example 1) and the cyclic ester polymer (PCL) as described in Example 5 on a two-roll mill for 5 minutes at 100° C. The milling characteristics of all these blends containing PCL were good and the hot strength of the blends during milling was adequate.

Samples of natural rubber, smoked sheet gumstock containing no PCL (No. 51) and samples of each blend 52 through 54 were molded into plaques and tested on the Instron tester. The results are given in Table IX. Quite surprisingly, the physical properties listed in the table illustrate that the blends were uniform and that natural rubber gumstock readily accepted the cyclic ester polymer. The data also illustrates that the creep resistance of the gumstock is considerably improved.

TABLE IX

Physical properties of natural rubber, smoked sheet, gumstock and PCL blends

| Blend No | 51 | 52 | 53 | 54 |
|---|---|---|---|---|
| Wt. percent PCL | 0 | 10 | 50 | 90 |
| 1% secant modulus, p.s.i.* | 26 | 79 | 7,200 | 26,800 |
| Yield stress, p.s.i. | | | 13 | 1,400 |
| Tensile strength, p.s.i. | 3 | 14 | 1,500 | 4,600 |
| Elongation, percent | 560 | 1,300 | 1,200 | 1,400 |
| Rupture energy, in.-lbs./in.³ | 33 | 150 | 9,800 | 31,000 |
| Strain rate, percent, in./in./min | 100 | 100 | 100 | 100 |

*1% secant modulus values obtained at a 10% strain rate, in./in./min.

EXAMPLE 7

A series of three blends (Nos. 56, 57 and 58) were prepared in the proportions shown in Table X below and poly(isobutylene) rubber gumstock having an approximate molecular weight of about 200,000 and a cyclic ester polymer as described in Example 5. The blends were milled on a two-roll mil at 125° C. to 170° C. for 5 to 15 minutes. Samples of the poly(isobutylene) containing no cyclic ester polymer and samples of each blend were molded into plaques. The plaques were then tested for physical properties on the Instron tester and the measurements shown in Table X were obtained. These data illustrate that the blends obtained were uniform.

TABLE X

Physical properties of poly(isobutylene) rubber gumstock and PCL blends

| Blend No | 55 | 56 | 57 | 58 |
|---|---|---|---|---|
| Wt. percent PCL | 0 | 10 | 50 | 90 |
| Youngs modulus | 7.4×10⁶ | 4.65×10⁶ | 2.5×10⁵ | 1.74×10⁹ |
| Yield stress, p.s.i. | | | 15 | 1,480 |
| Tensile strength, p.s.i. | 97 | 48 | 261 | 3,770 |
| Elongation, percent | 1,040 | 1,165 | 50 | 1,431 |
| Rupture energy, in.-lbs./in.³ | 677 | 86 | 106 | 72,860 |
| Strain rate, percent, in./in./min | 100 | 100 | 100 | 100 |

Substantially similar results are obtained as in respectively each of Examples 1 through 7 when the substantial homopolymer of and copolymers of two or more of the following cyclic esters are respectively substituted for the epsilon-caprolactone polymer in each of these examples: delta-valerolactone, zeta-enantholactone, etacaprylolactone, monomethyl - delta - valerolactone, monohexyl-delta-valerolactone, tri - n - propyl-epsilon-caprolactone, monomethoxy-delta-valerolactone, diethoxy-delta-valerolactone, diethyl - epsilon - caprolactone and monoisopropoxy-epsilon-caprolactone.

What is claimed is:

1. Cured and crosslinked vulcanizates of a mixture comprising about 10 to 99 weight percent of a rubber gumstock having substantial residual ethylenic unsaturation and about 1 to about 90 weight percent of a cyclic ester polymer having a reduced viscosity of about 0.1 to about 15 and containing at least a major molar amount of recurring units of the formula:

(I)

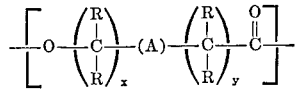

wherein each R, individually, is selected from the class consisting of hydrogen, alkyl, halo, and alkoxy; A is the oxy group; $x$ is an integer from 1 to 4; $y$ is an integer from 1 to 4; $z$ is an integer of zero or one; with the provisos that (a) the sum of $x+y+z$ is at least 4 and not greater than 7, and (b) the total number of R variables which are substituents other than hydrogen does not exceed 3, and up to a minor molar amount of recurring units of the formula:

(II) 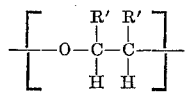

wherein each R' is selected from the class consisting of, individually, hydrogen, alkyl, cycloalkyl, aryl, and chloroalkyl, and, together with the ethylene moiety of the oxyethylene chain of Unit II a saturated cycloaliphatic hydrocarbon ring having 4 to 8 carbon atoms, said percentages being based on the total weight of cyclic ester polymer and rubber gumstock, and wherein the recurring units in the cyclic ester polymer are units of Formulas I and II only.

2. Cured and crosslinked vulcanizates as claimed in claim 1, wherein the reduced viscosity of said cyclic ester polymer is about 0.4 to 10 and said cyclic ester polymer is present in a minor amount and said rubber gumstock is present in a major amount.

3. Cured and crosslinked vulcanizates as claimed in claim 2, wherein said rubber gumstock is a natural rubber gumstock.

4. Cured and crosslinked vulcanizates as claimed in claim 2, wherein said rubber gumstock is vulcanizable synthetic rubber.

5. Cured and crosslinked vulcanizate as claimed in claim 4, wherein the vucanizable synthetic rubber gumstock is butyl rubber.

6. Cured and crosslinked vulcanizates as claimed in claim 1, wherein the cyclic ester polymer is a substantial homopolymer of epsilon-caprolactone.

7. A heat shrinkable film comprising the vulcanizate claimed in claim 1.

8. A heat shrinkable film comprising the vulcanizate claimed in claim 2.

9. A heat shrinkable film comprising the vulcanizate claimed in claim 3.

10. A heat shrinkable film comprising the vulcanizate claimed in claim 5.

References Cited
UNITED STATES PATENTS

| | | | |
|---|---|---|---|
| 2,962,524 | 11/1960 | Hostettler et al. | 260—484 |
| 3,305,605 | 2/1967 | Hostettler et al. | 260—873 |
| 3,313,753 | 4/1967 | Roberts et al. | 260—23 |

MURRAY TILLMAN, Primary Examiner

J. SEIBERT, Assistant Examiner

U.S. Cl. X.R.

204—159.12, 159.13, 159.14; 260—78.3 R, 824 R, 887, 890, 892, 893, 899, 901

UNITED STATES PATENT OFFICE
CERTIFICATE OF CORRECTION

Patent No. 3,637,544　　　Dated January 25, 1972

Inventor(s) R. D. Lundberg et al.

It is certified that error appears in the above-identified patent and that said Letters Patent are hereby corrected as shown below:

Column 16, lines 65 to 68, formula I should read as follows:

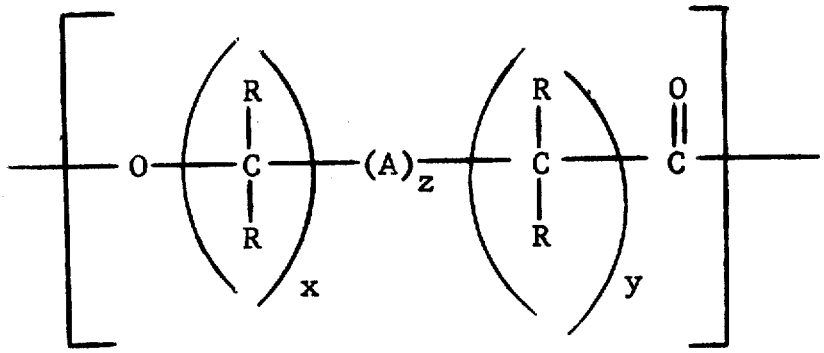

Signed and sealed this 27th day of June 1972.

(SEAL)
Attest:

EDWARD M. FLETCHER, JR.　　　ROBERT GOTTSCHALK
Attesting Officer　　　　　　Commissioner of Patents